Aug. 20, 1968    K. W. KAMPERT    3,397,893
CYLINDER CONSTRUCTION
Filed Aug. 3, 1966
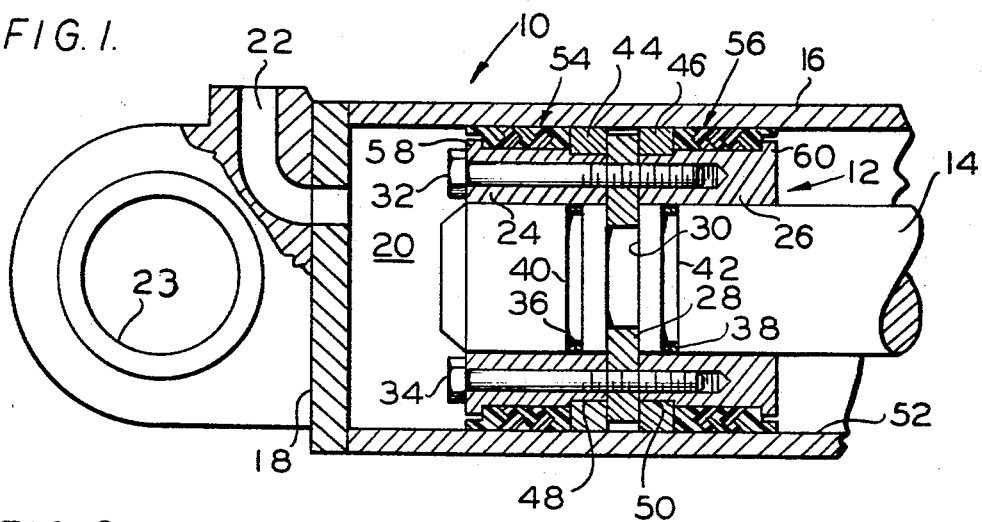
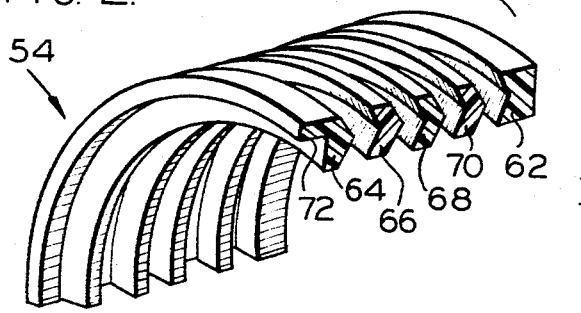
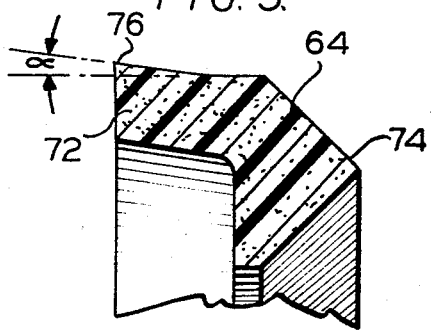
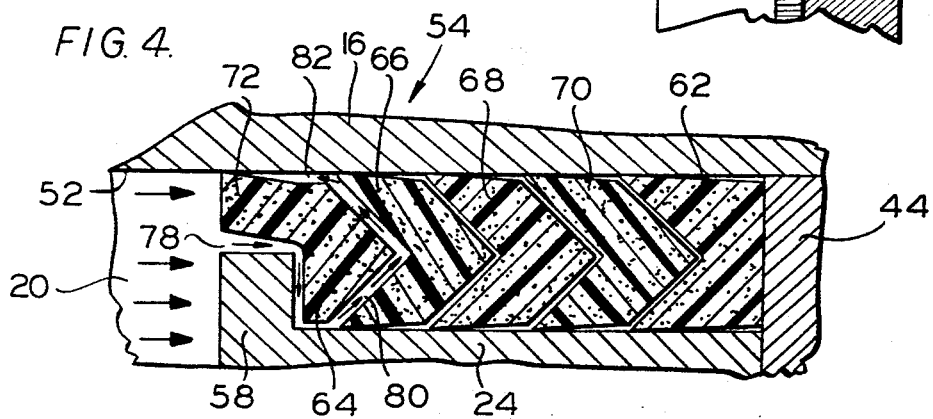
INVENTOR
KEITH W. KAMPERT
Richard E. Backus
ATT'Y

United States Patent Office 3,397,893
Patented Aug. 20, 1968

3,397,893
CYLINDER CONSTRUCTION
Keith W. Kampert, Libertyville, Ill., assignor to International Harvester Company, Chicago, Ill., a corporation of Delaware
Filed Aug. 3, 1966, Ser. No. 570,058
4 Claims. (Cl. 277—24)

ABSTRACT OF THE DISCLOSURE

A cylinder construction incorporating a wiper lip on the male adapter of the packing set for a reciprocating hydraulic piston. The construction permits fluid to flow around the male adapter to a location between the lip and cylinder wall during a working stroke of the piston so that the lip is unloaded and wear thereof is reduced.

Summary of the invention

This invention relates to hydraulic cylinders or rams and more particularly relates to a novel wiping lip for use with the packing set on the piston head of an hydraulic cylinder.

In conventional hydraulic cylinders the problem of scoring and wear of the packing sets and bearing rings on the piston head has been traced to the presence of minute foreign particles entrained in the hydraulic oil. These particles may consist of dirt or metal fragments which settle against the surface of the cylinder and are difficult to remove from the oil. During reciprocating action of the piston these particles may be forced between the cylinder and packing rings where they will tear the packing material, resulting in rapid wear and oil leakage past the rings. Previous designs for preventing these conditions have included the expedient of mounting a wiper ring adjacent the packing set to remove the particles on the return stroke of the piston. These rings are vulnerable to rapid wear themselves, however, because the high pressure during a working stroke will press the wiper against the cylinder wall with great force. One attempt to overcome this objectionable feature is illustrated by the Strader Patent No. 3,132,568 in which passageways are provided to direct fluid behind the wiper and unload the working pressure. Such a design is complicated and expensive, however, and introduces a distinct disadvantage in that the passageways will not unload the wiper fast enough during a rapid build-up of pressure with the result that the wiper will undergo undue wear.

Accordingly, it is an object of this invention to provide a novel wiper lip for use with the packing set of an hydraulic cylinder in which the lip is formed integral with the male adapter of the packing set and is radially spaced from the adjacent surfaces of the piston head and cylinder wall to permit fluid flow to unload pressure from the wiper lip during a working stroke of the piston.

Another object is to provide a wiper lip for use with the packing set of an hydraulic cylinder in which the male adapter of the packing set is formed with an outwardly and rearwardly projecting annular lip for removing foreign particles from the cylinder wall on the return stroke of the piston, and in which the lip is formed at its rear margin with its preassembled outer diameter greater than the inner diameter of the cylinder whereby the lip is resiliently urged against the cylinder wall after assembly of the packing set on the piston.

Another important object is to provide a wiper lip on the male adapter of a packing set in which the material of the male adapter has greater rigidity as compared to the material of the sealing rings of the packing set whereby the adapter will retain its shape under hydraulic pressure to permit unloading of the lip during a working stroke of the piston.

Description of the drawings

Other objects and advantages of the present invention will become apparent to those skilled in the art when the following specification is read in conjunction with the accompanying drawings wherein:

FIGURE 1 is a side elevation view, partially in cross-section, of a portion of an hydraulic cylinder incorporating a packing set embodying features of the present invention;

FIGURE 2 is an enlarged perspective view of an exploded portion of the packing set of the invention of FIGURE 1;

FIGURE 3 is an enlarged cross-sectional view of a male adapter for the packing set of the invention; and FIGURE 4 is an enlarged cross-sectional view of the invention illustrating assembly of the packing set between the piston head and cylinder.

Description of the preferred embodiment

Referring now to the drawings and particularly FIGURE 1 an extensible hydraulic cylinder is indicated generally at 10. The cylinder 10 comprises a piston head assembly 12 mounted on one end of piston rod 14 for reciprocating movement within cylindrical member 16. An end casting 18 is secured to the head end of cylindrical member 16 to define therewith an hydraulic chamber 20. A passageway 22 is provided in the end casting to direct fluid under pressure into the chamber under influence of an hydraulic control circuit (not shown). A bushing 23 is secured to the end casting for mounting the hydraulic cylinder on any suitable implement or frame member.

The piston head assembly 12 comprises first and second axially spaced half piston heads 24 and 26. The half piston heads are secured to the end of piston rod 14 by means of a split lock ring 28 fitted within annular groove 30 formed on rod 14. A plurality of cap screws 32 and 34 are provided to secure the half piston heads to the lock ring. A pair of O-ring seals 36 and 38 are fitted in annular grooves 40 and 42 formed in rod 14 to provide a fluid tight seal between the rod and half piston heads.

A pair of bearing rings 44 and 46, which may be fabricated from a suitable bearing material such as bronze, are mounted on reduced portions 48 and 50 formed on the half piston heads and serve to provide sliding bearing contact between the piston head assembly and cylinder wall 52 of the cylindrical member.

A pair of packing sets 54 and 56 are mounted on piston head assembly 12 to provide a fluid tight seal between the assembly and cylinder wall 52. Thus, packing set 54 functions to provide a seal when fluid under pressure in chamber 20 extends rod 14, while packing set 56 functions to provide a seal when fluid under pressure in the rod end of cylinder 10 retracts rod 14. Packing set 54 is mounted on half piston head 24 between bearing ring 44 and annular shoulder 58 formed at the end of piston head 24. Similarly, packing set 56 is mounted on half piston head 26 between bearing ring 46 and annular shoulder 60.

FIGURE 2 illustrates details of a one-quarter section of packing set 54. It is understood that packing set 56 is identical in construction to packing set 54, but is reversely mounted in the conventional manner on the piston head assembly. The packing set 54 comprises an annular female adapter 62 axially spaced from an annular male adapter 64 with a plurality of V-shaped packing rings 66, 68 and 70 positioned between the adapters. The packing rings are conventional and are formed from a suitable sealing material such as a composition of duck and rubber. This material affords sufficient flexibility for sealing purposes during a working stroke of the piston in which fluid under pressure in chamber 20 flows into the packing set. This fluid will act against the sides of the V-shaped rings and force them against the surfaces of the cylinder wall and half piston head.

Foreign particles, such as dirt or metal fragments entrained in the hydraulic oil, are removed from cylinder wall 52 by means of an annular wiper lip 72 formed integral with male adapter 64. As illustrated in FIGURE 3 the male adapter comprises a forwardly projecting wedge portion 74 which interfits with the V-shaped packing ring 66 and functions to retain the V-shape of the packing ring. This insures that the hydraulic pressure will properly act against the sides of the packing rings so that they will perform their sealing function.

The wiper lip 72 is fabricated with its outer surface projecting rearwardly at an angle α with respect to the longitudinal axis of the adapter. The adapter is formed in this manner so that the outer margin 76 of the wiper lip has a greater pre-assembled diameter than the inner diameter of cylinder wall 52. After assembly wiper lip 72 will be prestressed outwardly against the cylinder wall by the resiliency of the adapter material to insure wiping contact against the cylinder wall.

As illustrated in FIGURE 4 male adapter 64 is formed with a small radial spacing between its inner surface, annular shoulder 58, and half piston head 24. This spacing forms an annular passageway 78 which directs oil into annular space 80 between the male adapter and packing ring 66 where it will "set" packing set 54. The oil then flows from space 80 to the annular gap 82 between the wiper lip and cylinder wall. The material of the male adapter is formed from a suitable material such as a composition of duck and rubber having greater rigidity than the material of the packing rings. This insures that the adapter will retain its shape under the heavy hydraulic pressure during a working stroke so that the fluid will be free to flow into passageway 78, annular space 80, and annular gap 82.

During extension of the hydraulic cylinder pressure in chamber 20 will rise rapidly and bear against piston head assembly 12 for a working stroke of the piston rod. Fluid will flow through passageway 78 into the packing set which will form a fluid tight seal between the piston head and cylinder wall. This fluid will continue into annular gap 82 where it will equalize the pressure on wiper lip 72. This unloading of the wiper lip prevents the hydraulic fluid from forcing the lip outwardly against the cylinder wall and thus reduces wear on the lip throughout the working stroke as the piston head assembly 12 extends to the right.

During a return stroke the pressure in chamber 20 is reduced and piston head assembly 12 will move to the left. Wiper lip 72 is in wiping contact with cylinder wall 52 due to the pre-stressing of the outer margin 76 of the lip. During this return stroke the lip will remove any foreign particles on the cylinder wall which would otherwise be forced between the packing set and cylinder wall.

On a working stroke a sudden build-up of pressure in chamber 20 will quickly unload wiper lip 72 since annular passageway 78 and space 80 are adequate to deliver fluid at a high rate to gap 82 between the lip and cylinder wall. There are no narrow passageways which could be clogged with foreign particles and prevent rapid unloading of the wiper lip.

In view of the foregoing description, it is clear that applicant has provided herein a new and improved cylinder construction incorporating a wiper lip which efficiently removes foreign particles from the cylinder wall on a return stroke of the piston and which is rapidly unloaded on a working stroke to minimize wear on the lip.

It will be understood that various changes in the details, material, and arrangement of parts, which have been described and illustrated in order to explain the nature of the invention, may be made by those skilled in the art within the principle and scope of the invention as expressed in the appended claims.

What is claimed is:

1. In an hydraulic cylinder having a reciprocating piston operating responsive to hydraulic pressure on an end of the piston and having a packing set on the piston including sealing rings mounted between male and female adapter rings, the invention comprising the combination of: an annular wiper lip constrained for movement with the male adapter, the lip projecting into the hydraulic fluid from the pressure end of the piston and into wiping contact with the inner surface of the cylinder wall to remove foreign particles therefrom during a return stroke of the piston; the male adapter being substantially continuously radially spaced from the piston and the cylinder wall and being loosely fitted against the adjacent sealing ring to permit fluid to flow rapidly between the adapter and the piston, between the adapter and the sealing ring, and between the adapter and the cylinder wall when said pressure end is subject to hydraulic fluid under pressure during a working stroke of the piston.

2. The invention as defined in claim 1 wherein: the lip is formed at its rear margin with a pre-assembled outer diameter greater than the inner diameter of the cylinder to insure said wiping contact after assembly of the packing set and piston within the cylinder.

3. The invention as defined in claim 1 wherein: the sealing rings comprise a first material having a certain rigidity whereby the rings are deformed under pressure into sealing contact with the cylinder and piston walls, and the male adapter comprises a second material having greater rigidity as compared to the first material whereby the adapter will retain its shape under pressure and permit unloading of the lip during a working stroke of the piston.

4. The invention as defined in claim 1 wherein: the male adapter is formed with a forwardly projecting wedge portion loosely interfitting between the side portions of the adjacent sealing ring to reshape the sealing rings on said return stroke, and to permit fluid pressure to act against the sealing ring and subsequently flow between the lip and cylinder wall during the working stroke.

References Cited

UNITED STATES PATENTS

| | | | |
|---|---|---|---|
| 3,266,810 | 8/1966 | Reeser | 277—24 |
| 2,042,569 | 6/1936 | Wallace | 92—182 |
| 2,658,809 | 11/1963 | Schultz | 92—258 X |
| 2,801,140 | 7/1957 | Kretzer | 92—251 X |
| 2,907,614 | 10/1959 | Rosen | 92—252 X |
| 3,132,568 | 5/1964 | Strader | 92—252 X |
| 3,312,150 | 4/1967 | Strader | 92—252 |
| 3,314,683 | 4/1967 | Schmidt et al. | 92—250 X |

MARTIN P. SCHWADRON, *Primary Examiner.*

G. N. BAUM, *Assistant Examiner.*